United States Patent [19]
Binz

[11] 4,332,478
[45] Jun. 1, 1982

[54] METHOD AND APPARATUS FOR REDUCING SMOKE EMISSIONS IN AN ASPHALT DRUM MIXER

[75] Inventor: Lee V. Binz, Hamshire, Ill.

[73] Assignee: Barber-Greene Company, Aurora, Ill.

[21] Appl. No.: 39,383

[22] Filed: May 16, 1979

[51] Int. Cl.³ .............................................. B28C 5/46
[52] U.S. Cl. ......................................... 366/4; 366/25; 366/33
[58] Field of Search ....................... 366/25, 24, 23, 22, 366/4, 5, 7, 147, 33; 106/280

[56] References Cited

U.S. PATENT DOCUMENTS

| | | | |
|---|---|---|---|
| 3,614,071 | 10/1971 | Brock | 366/4 |
| 3,832,201 | 8/1974 | Shearer | 366/147 |
| 3,845,941 | 11/1974 | Mendenhall | 366/24 |
| 3,999,743 | 12/1976 | Mendenhall | 366/25 |
| 4,000,000 | 12/1976 | Mendenhall | 106/280 |
| 4,034,968 | 7/1977 | Mendenhall | 366/25 |
| 4,075,710 | 2/1978 | Jakob | 366/25 |
| 4,147,436 | 4/1979 | Garbelman | 366/25 |
| 4,190,370 | 2/1980 | Brock | 366/25 |
| 4,211,490 | 7/1980 | Brock | 366/25 |

Primary Examiner—Robert W. Jenkins
Attorney, Agent, or Firm—McDougall, Hersh & Scott

[57] ABSTRACT

A method and apparatus are disclosed which reduce smoke emissions in an asphalt drum mixer. A drum mixer heats virgin aggregate to a relatively high temperature in a first drying zone. Virgin asphalt and, in some cases, recycled pavement material containing asphalt, are added in a second zone. Mixing and discharge of the materials occur in a third zone. The invention provides for air or water cooling of the gases in the drum mixer upstream of the point of entry of the asphalt. This cooling reduces the formation of smoke which would otherwise be generated by excessive heating of the asphalt. The apparatus, according to a preferred embodiment, employs an axially positioned air duct, the outlet end of which discharges cooling air into the drum just upstream of the area of entry of the recycled material.

22 Claims, 3 Drawing Figures

METHOD AND APPARATUS FOR REDUCING SMOKE EMISSIONS IN AN ASPHALT DRUM MIXER

BACKGROUND OF THE INVENTION

This invention relates to the field of asphalt mixing devices. More specifically, the invention relates to the field of rotating drum asphalt mixers which combine virgin aggregate with fresh asphalt and, in some cases, combine these virgin materials with recycled or reclaimed pavement material obtained by breaking up all or a layer of an existing asphalt pavement.

Drum mixers of the type referred to receive virgin aggregate at an imput end near a heat source. This aggregate is heated to a high temperature for drying purposes. The heated aggregate is subsequently combined with fresh asphalt in either liquid or solid form. In some cases, it is desirable to add recycled pavement material which of course includes old asphalt as well as old aggregate. The asphalt and recycled material containing asphalt are introduced into the drum at an intermediate point where the temperatures are lower. The introduction of these materials in such an area is necessary because exposure of the asphalt (either fresh or as part of the recycled material) to high temperatures causes hydrocarbon smoke emissions of significant proportions.

Drum gas temperature is dependent on several factors, such as the proportion of virgin aggregate to recycled paving material, moisture content of any recycled material added, combustion gas temperature, mix temperature, and physical characteristics of the drum (e.g., length, diameter, rate of heat loss, etc.). If the temperature of the gases in the drum is excessive in the area where fresh asphalt and/or asphalt contained in recycled materials are added to the drum, undesirable amounts of smoke are generated.

One technique employed to reduce the smoke emissions under the foregoing operating conditions is to introduce excess combustion air into the drum at the input end of the mixer adjacent the burner; this procedure results in lower gas temperatures throughout the drum which would indicate a possible solution to the smoke problem. However, the lower temperatures in the first zone where the virgin aggregate is heated results in relatively low virgin aggregate temperatures and thus insufficient drying; this inadequate drying of the aggregate is detrimental to the efficient operation of the drum mixer and to the quality of the resulting product. For maximum efficiency, it is desirable to operate the gas or fuel oil burner (used to heat the drum) at the maximum combustion temperature to produce extremely hot gases which provide maximum heat transfer to the virgin aggregate. Such operation reduces the amount of virgin aggregate needed to produce a satisfactory product but, of course, this operation at high temperatures aggravates the smoke problem.

It is accordingly an object of the present invention to provide a method and apparatus for making an asphalt paving material using virgin aggregate, fresh asphalt and, if desired, recycled pavement materials, whereby the virgin aggregate in a drum mixer can be heated to a high temperature with maximum heat transfer while maintaining hydrocarbon smoke emissions from the asphalt at an acceptable level.

Another object of the invention is to provide a method and apparatus for cooling a selected portion of an asphalt drum mixer at the area or zone of entry of the asphalt, either in fresh or recycled form, to prevent excessive hydrocarbon smoke emissions.

It is also an object of the invention to provide a method and apparatus for injecting a cooling fluid into a drum mixer for asphalt to reduce the gas temperature at a selected portion thereof.

Other objects and advantages of the invention will be apparent from the remaining portion of the specification.

As indicated, drum mixers for use in preparing hot asphalt paving compositions are known. It is also known to provide asphalt mixers in which asphalt and/or recycled materials are added to the drum mixer at different locations. Drum mixers conventionally employ a gas or oil burner at an input end; these drums rotate and include internal flights for lifting the material and allowing it to drop through the hot gases as the material proceeds from the input end to a discharge end of the drum.

The present invention has particular, although not exclusive, application to drum mixers of the type adapted to utilize recycled pavement material. Because of the high cost of virgin aggregate and asphalt liquid, and because of the desirability of conserving natural resources, it is preferable to use old pavement materials whenever practical. If the asphalt in this recycled material is heated to excessive temperatures, significant amounts of hydrocarbon smoke are generated, presenting an obvious pollution problem. For that reason, the recycled material is generally admitted to the drum downstream from the input end at a substantial distance from the burner. Sometimes this physical spacing is sufficient to prevent the formation of excess amounts of smoke where the mix includes a large proportion of virgin aggregate, when the mix temperature is maintained at a relatively low level and when the combustion temperature is not too high.

For reasons of economy and efficiency, it is often desirable to utilize a high proportion of recycled material in relation to the proportion of virgin aggregate. When the amount of recycled material exceeds the amount of virgin aggregate, the smoke generated becomes excessive due to overheating of the asphalt admitted as part of the recycled materials.

Even when recycled material is not being used, the problem of excessive smoke emissions in the use of drum mixers is often present. The use of drum mixers in the making of asphalt paving material is a relatively new technology. As advances are made in this technology, it is believed that higher and higher combustion temperatures will be made possible in the interest of improving efficiency in drying the virgin aggregate when relatively high mix temperatures are required. Needless to say, these increased temperatures in the drying zone for the virgin aggregate will bring about smoke emission problems since the temperature in the drum where the fresh asphalt material is received will be high enough to generate an undesirable amount of smoke. The present invention provides a solution to this problem and permits maximum drying temperatures when using only virgin aggregate and only fresh asphalt.

It has been discovered that this undesirable smoke emission in the applications just described can be significantly reduced, if not entirely elminated, by the controlled admission of a selected amount of cooling fluid into the drum adjacent, and preferably just upstream of, the area or "zone" where the asphalt and/or recycled material is admitted to the drum. According to the present invention, this cooling is accomplished by forcing ambient air into the drum, or by water cooling, although the former is preferred. Control of the volume of air introduced can be accomplished by means of a variable speed fan or a damper arrangement. In the case of a water system, a variable flow water pump supplying water to a heat exchanger may be employed.

Introduction of cooling air into the mixing drum is accomplished, in the preferred embodiment illustrated in the drawings, by means of an axially located pipe which brings ambient air from the discharge end of the mixer to a location in the drum just upstream of the hopper through which recycled material is introduced. In the water-cooled embodiment, not illustrated herein, a heat exchanger could be similarly positioned upstream of the point of introduction of the recycled material to reduce the temperature of the gases.

PRIOR ART STATEMENT

In accordance with the provisions of 37 CFR §1.97, applicant advises that the following U.S. patents are the closest prior art of which he is aware: U.S. Pat. Nos. 3,999,743 to Mendenhall; 4,000,000 to Mendenhall; 3,614,071 to Brock; 3,832,201 to Shearer; 4,075,710 to Jakob et al.; 4,034,968 to Mendenhall; and 3,845,941 to Mendenhall.

In Mendenhall '743, recycled paving compositions are separated according to their coarseness. The finer particles are injected into the drum mixer farther from the heat source than the coarser particles, all in an attempt to control smoke emissions. In an alternate embodiment, a flame barrier and diffuser are utilized to control heating. Mendenhall '743 does not contemplate the use of virgin aggregate.

Mendenhall '000 and '941 disclose asphalt drum mixers in which the hydrocarbon exhaust gases are recycled. Mendenhall '000 utilizes only recycled material in the mixer while Mendenhall '941 utilizes only virgin aggregate.

Brock '071 discloses a typical asphalt mixer in which virgin aggregate is admitted at one end, heated and dispensed from the opposite end. Temperature sensors are provided for controlling the burner temperature. Air flows through the entire length of the drum and is exhausted through a stack. Brock does not comtemplate the use of recycled material.

Shearer discloses a method for controlling particulate emission by contacting the aggregate with an asphalt composition at or before its introduction into the heated mixing zone. The composition is then rapidly moved through the heating zone. Shearer does not contemplate the use of recycled materials.

Jakob et al. show a drum mixer for virgin and recycled aggregate. A conveyor mechanism having a heat shield thereon is utilized for introducing the recycled aggregate into the drum. Mendenhall '968 discloses a drum mixer having a plurality of exhaust ports for exhausting water vapor from the mixer.

None of these patents show, or even comtemplate, the controlled admission of a cooling fluid into a drum mixer just upstream of the area where the asphalt material is admitted.

DETAILED DESCRIPTION

Figure 1:
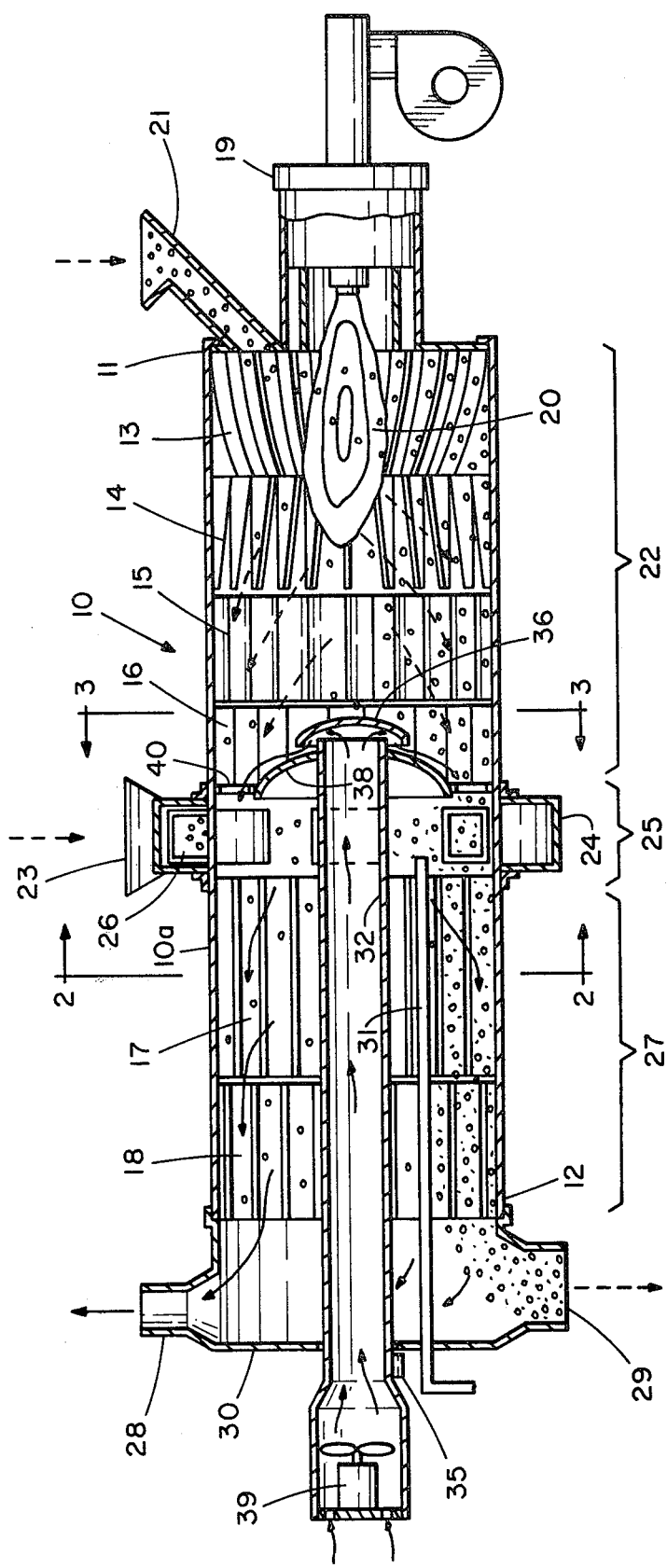
FIG. 1 is a longitudinal, cross-sectional, schematic view of a drum mixer according to a preferred embodiment of the invention.

Referring to the drawings, a drum mixer according to a preferred embodiment of the invention is illustrated. The drum, generally designated 10, is in the form of a rotatable cylinder 10a including an inlet end 11 and an outlet end 12. A plurality of flights or vanes are mounted on the inside of the drum wall. These flights, which are in various shapes defining sections 13 through 18, are provided for lifting the aggregate and for dropping the same through the hot gases. The drum is inclined for advancing the material downstream from the inlet end to the outlet end.

Positioned at the inlet end is a stationary burner assembly 19 which produces a high temperature flame 20 projecting into the drum for heating virgin aggregate which is introduced through a stationary hopper 21. The flame and hot gases from the burner project for some distance into a first heating zone 22 of the drum mixer (defined generally by vane sections 13-16). The virgin aggregate is thus heated to a desired temperature in the zone 22.

Figure 2:
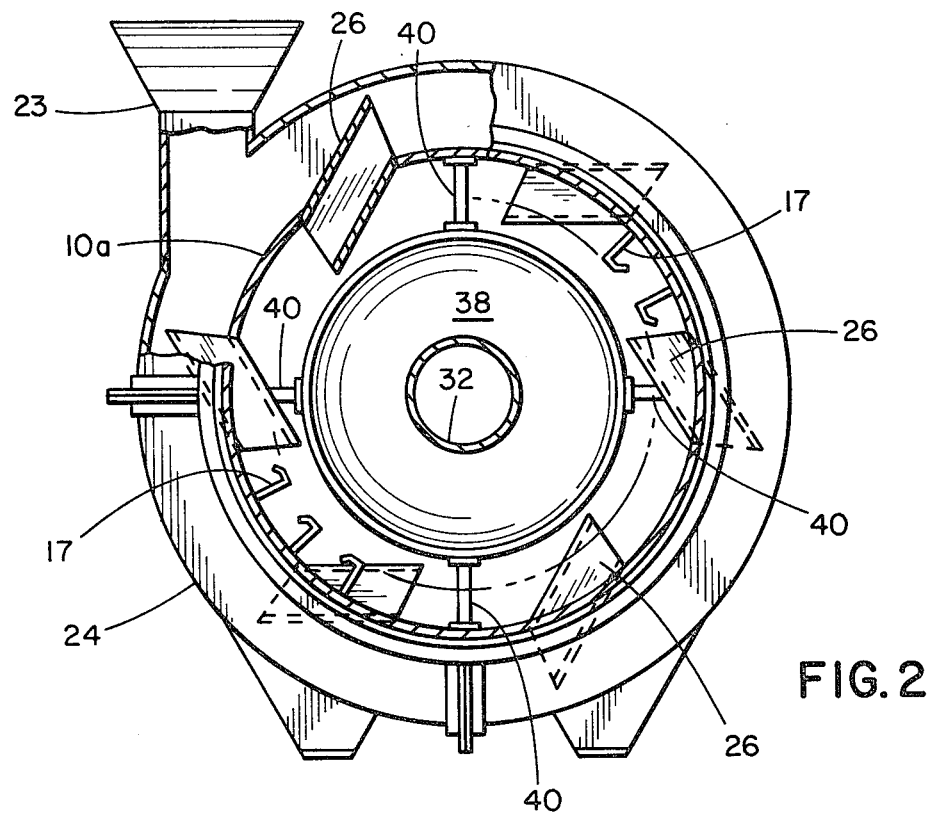
FIG. 2 is a sectional view along the line 2—2 of FIG. 1 illustrating the mechanism for introducing recycled material into the drum.
Figure 3:
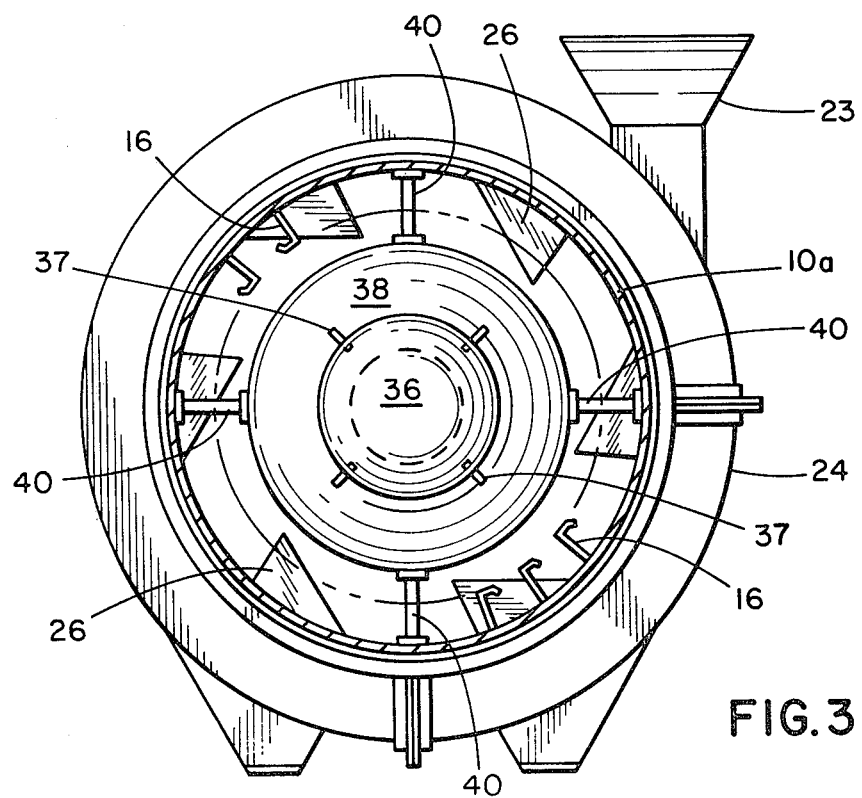
FIG. 3 is a sectional view along the line 3—3 of FIG. 1 primarily illustrating the parts which act as a heat shield dividing the drum into a heating zone and a mixing zone.

Located intermediate the ends of the drum is a stationary hopper 23 through which recycled material may be added for mixing with the virgin aggregate. As indicated in FIG. 2, the hopper 23 serves as a passage into a stationary shroud 24. This shroud is located intermediate the rotating vane sections 16 and 17 and defines a second zone 25 in which fresh asphalt and, in some cases, recycled pavement material is added.

A plurality of chutes 26 are welded in openings formed in the cylindrical wall 10a of the drum. The chutes are hollow enclosures positioned, such that during drum rotation, they sequentially pass under the hopper 23. If recycled material is to be added, the chutes convey this material from the entry area of the shroud 24 into the interior of the drum.

In a third, mixing zone 27 of the drum (defined generally by the vane sections 17 and 18), the virgin aggregate, the asphalt and, in some cases, the recycled material, are mixed by the rotation of the drum to produce the paving composition. At the outlet end 12 of the drum, the hot gases are exhausted through a flue 28 and the paving mixture is discharged through an opening 29; the flue and the discharge opening are formed in a stationary section 30 which is journaled with the rotating drum.

A fresh bituminous composition, preferably liquid asphalt, is introduced by means of a pipe 31, supported by the stationary section 30, and passing into the drum with the outlet end of the pipe being disposed in the zone 25. The pipe 31 serves as the sole supply of asphalt when only virgin aggregate is admitted to the drum. When recycled pavement material is admitted (which of course includes asphalt), the pipe 31 serves as the supply of whatever makeup asphalt may be required.

(As used herein, the expression "asphaltic material" shall refer to fresh asphalt, in either liquid or solid form, and/or to asphalt admitted as part of recycled pavement material.)

As previously indicated, if burner temperature is to be quite high, as is sometimes desirable, it is necessary to lower the temperature in the second zone (where fresh and/or recycled asphalt are admitted) to prevent unacceptable hydrocarbon smoke emissions. For that purpose, cooling fluid is introduced into the second zone of the drum mixer, preferably immediately upstream of the point where the asphalt is introduced into the drum.

In the preferred embodiment illustrated in the drawing, this introduction of cooling fluid is accomplished by means of an axially positioned pipe or air duct 32 which extends from the stationary section 30 at the outlet end of the drum mixer to a position in the drum immediately upstream of the area where asphalt and recycled material are admitted. The duct 32 is positioned on the axis of rotation of the drum as shown.

A heat shield and diverter assembly is positioned over the discharge end of the duct to reflect heat from the burner and to divert the cooling air as it exits from the duct. The assembly comprises a first cap-shaped member 36 connected by struts 37 to a bell-shaped member 38. The discharge end of the duct 32 passes through a centrally located opening in the member 38 and terminates at a position between the members 36 and 38. The shield and diverter assembly is secured for rotation with the drum section 10 by a plurality of spokes 40 which connect the member 38 to the inside of the drum.

The discharge end of the duct 32 is preferably secured to the member 38 and rotates therewith. As indicated by the arrows, the diverter assembly deflects air discharged from the duct towards the outlet end of the mixer to insure mixing with and cooling of the hot gases moving from the first zone 22 to the second zone 25.

The intake end of the duct 32 projects through an opening in the wall of the stationary section 30 and is rotatably supported on a pair of rollers 35 forming a support cradle. A fan 39 mounted on the intake end of the duct draws outside air and forces the same through the duct 32 into the interior of the drum.

The requirement for, and the amount of, cooling air necessary to prevent excessive smoke formation is a function of several variables which include: the ratio of virgin aggregate to recycled material, physical characteristics of the drum mixer, the condition of the reclaimed material (particularly moisture content), the heating capacity of the burner, the mix discharge temperature and the temperature of the ambient air. These variables which will determine the amount of cooling air required may be categorized into four major factors now to be discussed.

The first major factor is the nature of the aggregate material used, i.e., whether virgin or recycled or a combination thereof. As already explained, in some applications of the present invention only virgin aggregate will be used; in other applications, recycled aggregate will be admitted. When recycled aggregate is admitted, it is desired to add virgin aggregate in an amount of at least 10% by weight. Thus, in carrying out the present invention, the amount of virgin aggregate will vary from a minimum of 10% to a maximum of 100%.

The second major factor is mix temperature, i.e., the material temperature at the outlet end of the drum; this temperature will vary in the range of 200° F. to 350° F. depending on job requirements. Factors affecting operation of the drum mixer to obtain the desired mix temperature are many, including ambient air temperature, physical characteristics of the drum (e.g., length, diameter, rate of heat loss, etc.), type of fuel and combustion gas temperature.

The third major factor is the moisture content of the recycled pavement material; this will vary in the range from 0% to 7% by weight. In an application where only virgin aggregate is employed, moisture content of the aggregate will not be a factor as the aggregate will be sufficiently dried in the heating zone 22 before reaching the zone 25 where the fresh asphalt is admitted.

The fourth major factor contributing to the amount of cooling air required is combustion gas temperature. This temperature will vary in the range from 2000° F. to 3100° F.

Fan 39 should be capable of producing sufficient air flow to deal with worst conditions. Preferably, the fan employs a constant speed motor with an adjustable damper so that the air output may be closely tailored to the requirements for a given set of operating conditions. Of course, the duct 32 must be adequately sized to receive the resulting quantity of air.

Although the quantity of air required will vary, depending on the various factors referred to above, certain quantitative data can be empirically arrived at to determine the amount of cooling air required to prevent undesirable smoke emissions. The following table specifies, as a function of the temperature of the gases in the drum mixer immediately upstream of the second zone, the percentage range by volume of cooling air relative to the total volume of air passing through the drum which must be introduced to maintain smoke levels within acceptable limits.

| Temp. of Gases (°F.) Immediately Upstream of Second Zone | Cooling Air as % of Total Airflow by Volume |
| --- | --- |
| 700 or less | 0% cooling air |
| 700–900 | 0% to 25% |
| 900–1100 | 10% to 40% |
| 1100–1300 | 20% to 50% |
| 1300–1500 | 33% to 57% |

The cooling air percentages set forth in the above table produce temperatures in the second and third zones 25 and 27 which are low enough to avoid excessive smoke formation. In order to illustrate use of the present invention, two drum mixer operating modes will be described. In the first mode, the mix consists of essentially virgin aggregate and fresh liquid asphalt. In the second mode, the mix may be in the range of 50%–90% recycled material, 10%–50% virgin aggregate, and enough fresh liquid asphalt to coat the virgin aggregate and to provide any necessary make-up asphalt for the reused materials.

FIRST OPERATING MODE

Since the mix does not include recycled materials, the hopper 23 and chutes 26 are of course not utilized. Very high combustion temperatures are desirably employed in the first heating zone 22 (up to 3100° F.) to heat the large quantity of virgin aggregate processed by the mixer to achieve the desired mix temperature. The heating dries the aggregate and insures thorough mixing with the liquid asphalt supplied from pipe 31. To maintain the temperature in the second zone 25 (where the asphalt is admitted) below that at which hydrocarbon smoke is formed, cooling air is injected into the mixer through duct 32 as previously described. The cooling air is injected into the drum, preferably immediately upstream of the location where the heated virgin aggregate contacts the liquid asphalt; this location is immediately upstream of the junction of the first and second zones 22 and 25, respectively. The amount of cooling air is modulated in accordance with the values given in the table.

SECOND OPERATING MODE

Many different ratios of virgin aggregate to recycled material are possible, although, as mentioned above, it is preferred that at least 10% by weight of the mix be virgin aggregate. Assuming a ratio of 80% recycled to 20% virgin aggregate, the smaller amount of virgin aggregate available to absorb the heat energy will result in excessively high temperatures at the downstream end of the heating zone 32. To control smoke emissions under these circumstances, the gases must be cooled before reaching (1) the asphalt contained in the recycled material being added through the chutes 26 and (2) the small amount of fresh liquid asphalt being added by pipe 31. Since the discharge of the air duct 32 is just upstream of the locations at which the asphalt is added, in both virgin and recycled form, this requirement is met. The cooling air is metered into the mixer in accordance with the values set forth in the table.

In actual practice—and this applies to both operating modes referred to above—it has been found that a skilled operator can maintain smoke emission within acceptable limits by observing the condition of the exhaust gases exiting from the flue 28 and by controlling the speed of the fan 39 and/or by controlling the dampers as necessary. Of course, automatic control of the amount of cooling fluid could be provided. For example, a temperature sensor could be mounted in the drum immediately upstream of the juncture of the first and second zones; this sensor could actuate an electrical system for varying speed of the fan motor or for controlling the dampers as required.

While I have shown and described embodiments of this invention in some detail, it will be understood that this description and illustrations are offered merely by way of example, and that the invention is to be limited in scope only by the appended claims.

I claim:

1. A method of controlling smoke emissions from a drum mixer of the type having an inlet end and an outlet end and adapted for making paving material, such method comprising the steps of:
   (a) introducing aggregate into said drum adjacent the inlet end thereof;
   (b) heating said aggregate in a first heating zone by a heating means located in the drum adjacent the inlet end thereof;
   (c) conveying said aggregate downstream from the inlet end of the drum to the outlet end thereof;
   (d) introducing asphaltic material into said drum at a second zone therein which adjoins the first zone downstream of the latter;
   (e) cooling the hot gases in the drum by controllably contacting such gases with a non-liquid cooling medium which is introduced in the drum in a substantially uniform pattern transversely thereof and in an area adjacent to and upstream of the second zone;
   (f) mixing the aggregate and the asphaltic material in the drum in a third mixing zone which adjoins the second zone downstream of the latter; and,
   (g) discharging the resulting mixture from the outlet end of the drum.

2. The method according to claim 1 wherein the cooling medium is introduced immediately upstream of the juncture of the first and second zone.

3. The method according to claim 1 wherein the step of introducing asphaltic material is carried out, at least in part, by introducing virgin asphalt into said second zone.

4. The method according to claim 1 or claim 3 wherein the step of introducing the asphaltic material is carried out in part by introducing recycled pavement material into said second zone.

5. The method according to claim 1 wherein the step of heating includes the substep of directing the flame from a burner assembly into the first zone whereby the flame and combustion gases contact the aggregate to heat it.

6. The method according the claim 1 wherein the step of introducing a cooling medium is carried out by controllably admitting air into the drum.

7. The method according to claim 1 wherein the step of introducing a cooling medium is carried out by controllably introducing a volume of cooling air into said drum in a relationship to the temperature in the drum at a location immediately upstream of the juncture of the first and second zones in accordance with the following table:

| Temp. of Gases (°F.) Immediately Upstream of Second Zone | Cooling Air as % of Total Airflow by Volume |
| --- | --- |
| 700 or less | 0% cooling air |
| 700–900 | 0% to 25% |
| 900–1100 | 10% to 40% |
| 1100–1300 | 20% to 50% |
| 1300–1500 | 33% to 57% |

8. The method according to claim 1 or claim 3 wherein the step of introducing aggregate to the inlet end of the drum is carried out by admitting predominantly virgin aggregate.

9. An apparatus for producing paving material with reduced smoke emissions comprising:
   (a) a rotating drum mixer having inlet and outlet ends and having means in the drum for lifting and dropping the materials as they pass from the inlet end to the outlet end during drum rotation;
   (b) means for introducing aggregate into a first zone in the drum near the inlet end of the latter;
   (c) means in the first zone for heating the aggregate;
   (d) means for introducing asphaltic material into a second zone in the drum, which second zone adjoins the first zone downstream of the latter;
   (e) means in the drum adjacent to and upstream of the second zone, for controllably contacting the gases with a non-liquid cooling medium thereby to maintain the temperature in the second zone at a level which will prevent the formation of undesirable emissions which would otherwise result from contact of the asphaltic material with the hot gases in the first zone;
   (f) said drum including a third zone where the aggregate and asphaltic material are mixed as they are conveyed to the outlet end of the drum, such third zone adjoining the second zone downstream of the latter; and, (g) means at the outlet end of the drum for discharging the resulting mix from the drum mixer.

10. The apparatus according to claim 9 wherein said cooling medium means includes:

means for admitting cooling air into said drum at a location adjacent the juncture of the first and second zones.

11. The apparatus according to claim 10 wherein said admitting means includes:

(a) an air duct communicating with the outside of said drum and extending into the latter, which duct has an outlet end at said location adjacent the juncture of the first and second zones; and (b) means for forcing cooling air into said duct.

12. The apparatus according to claim 11 further including a heat shield mounted adjacent said outlet end of the duct.

13. The apparatus according to claim 11 wherein said duct is positioned parallel to the axis of rotation of said drum and extends through the outlet end thereof.

14. The apparatus according to claim 11 wherein said means for forcing cooling air is a fan with an adjustable air damper, whereby the amount of cooling air admitted into said duct can be controlled according to process conditions.

15. The apparatus according to claim 9 wherein said asphaltic material introducing means includes means for admitting recyclable pavement material into said second zone.

16. The apparatus according to claim 15 wherein said admitting means includes:

hopper means adjacent the wall of said drum through which said recycled material passes; and chute means in the wall of the drum for conveying the recycled material from the hopper means into the second zone.

17. The apparatus according to claim 15 wherein said admitting means includes a pipe for discharging fresh liquid asphalt into the second zone.

18. A method of controlling smoke emissions from a drum mixer of the type having an inlet end and an outlet end and adapted for making paving material, such method comprising the steps of:

(a) introducing aggregate into said drum adjacent the inlet end thereof;

(b) heating said aggregate in a first heating zone by a heating means located in the drum adjacent the inlet end thereof;

(c) conveying said aggregate downstream from the inlet end of the drum to the outlet end thereof;

(d) introducing recycled asphalt-aggregate material into said drum at a second zone therein which adjoins the first zone downstream of the latter;

(e) cooling the hot gases in the drum by controllably contacting such gases with a non-liquid cooling medium which is introduced in the drum in a substantially uniform pattern transversely thereof and in an area adjacent the juncture of the first and second zones;

(f) mixing the aggregate and the asphaltic material in the drum in a third mixing zone which adjoins the second zone downstream of the latter; and, (g) discharging the resulting mixture from the outlet end of the drum.

19. A method of controlling smoke emissions from a drum mixer of the type having an inlet end and an outlet end and adapted for making paving material, such method comprising the steps of:

(a) introducing aggregate into said drum adjacent the inlet end thereof;

(b) heating said aggregate in a first heating zone by a heating means located in the drum adjacent the inlet end thereof;

(c) conveying said aggregate downstream from the inlet end of the drum to the outlet end thereof;

(d) introducing asphaltic material into said drum at a second zone therein which adjoins the first zone downstream of the latter;

(e) cooling the hot gases in the drum by controllably introducing a volume of cooling air into said drum in a relationship to the temperature in the drum at a location immediately upstream of the juncture of the first and second zones in accordance with the following table:

| Temp. of Gases (°F.) Immediately Upstream of Second Zone | Cooling Air as a % of Total Airflow by Volume |
| --- | --- |
| 700 or less | 0% cooling air |
| 700–900 | 0% to 25% |
| 900–1100 | 10% to 40% |
| 1100–1300 | 20% to 50% |
| 1300–1500 | 33% to 57% |

(f) mixing the aggregate and the asphaltic material in the drum in a third mixing zone which adjoins the second zone downstream of the latter; and, (g) discharging the resulting mixture from the outlet end of the drum.

20. An apparatus for producing paving material with reduced smoke emissions comprising:

(a) a rotating drum mixer having inlet and outlet ends and having means in the drum for lifting and dropping the materials as they pass from the inlet end to the outlet end during drum rotation;

(b) means for introducing aggregate into a first zone in the drum near the inlet end of the latter;

(c) means in the first zone for heating the aggregate;

(d) means for introducing recycled asphalt-aggregate material into a second zone in the drum, which second zone adjoins the first zone downstream of the latter;

(e) means in the drum in the area adjacent the juncture of the first and second zones for controllably contacting the gases with a non-liquid cooling medium thereby to maintain the temperature in the second zone at a level which will prevent the formation of undesirable emissions which would otherwise result from contact of the asphaltic material with the hot gases in the first zone;

(f) said drum including a third zone where the aggregate and asphaltic material are mixed as they are conveyed to the outlet end of the drum, such third zone adjoining the second zone downstream of the latter; and, (g) means at the outlet end of the drum for discharging the resulting mix from the drum mixer.

21. The apparatus according to claim 20 wherein said admitting means includes:

hopper means adjacent the wall of said drum through which said recycled material passes; and, chute means in the wall of the drum for conveying the recycled material from the hopper means into the second zone.

22. The apparatus according to claim 20 wherein said admitting means includes a pipe for discharging fresh liquid asphalt into the second zone.

* * * * *